(12) United States Patent
Link et al.

(10) Patent No.: US 7,582,149 B2
(45) Date of Patent: Sep. 1, 2009

(54) MONOAZO COLORANTS FROM PYRAZOLOBENZODIAZINEDIOXIDES

(75) Inventors: Steven G. Link, Rochester, NY (US); Joan C. Potenza, Rush, NY (US); Ann L. Carroll-Lee, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/015,110

(22) Filed: Jan. 16, 2008

(65) Prior Publication Data
US 2009/0181170 A1 Jul. 16, 2009

(51) Int. Cl.
C09D 11/02 (2006.01)
B41J 2/01 (2006.01)
C09B 29/033 (2006.01)

(52) U.S. Cl. ........... 106/31.48; 106/31.46; 106/31.5; 106/31.76; 106/31.77; 106/31.78; 347/100; 534/752

(58) Field of Classification Search ........... 106/31.48, 106/31.46, 31.5, 31.76, 31.77, 31.78; 534/752, 534/766, 768, 769; 347/100
See application file for complete search history.

(56) References Cited

U.S. PATENT DOCUMENTS

| | | | | |
|---|---|---|---|---|
| 3,316,238 | A * | 4/1967 | Menzel et al. | 534/752 |
| 4,419,289 | A * | 12/1983 | Fleischer et al. | 534/752 |
| 5,024,930 | A | 6/1991 | Kita et al. | 430/558 |
| 5,026,427 | A | 6/1991 | Mitchell et al. | 106/31.6 |
| 5,086,698 | A | 2/1992 | Wirz | 101/409 |
| 5,141,556 | A | 8/1992 | Matrick | 106/31.58 |
| 5,160,370 | A | 11/1992 | Suga et al. | 347/100 |
| 5,169,436 | A | 12/1992 | Matrick | 106/31.58 |
| 6,001,161 | A | 12/1999 | Evans et al. | 106/31.48 |
| 6,464,767 | B1 | 10/2002 | Evans et al. | 106/31.48 |
| 6,468,338 | B1 | 10/2002 | Evans et al. | 106/31.48 |
| 6,582,502 | B2 * | 6/2003 | Fujiwara | 106/31.48 |
| 6,855,195 | B2 * | 2/2005 | Nishita et al. | 106/31.48 |
| 7,056,375 | B2 * | 6/2006 | Potenza et al. | 106/31.5 |

FOREIGN PATENT DOCUMENTS

| | | |
|---|---|---|
| BE | 628115 | 2/1963 |
| GB | 988972 | 5/1963 |
| JP | 6-287459 A | 10/1994 |
| JP | 3-241858 B2 | 12/2001 |
| JP | 2005-082670 A | 3/2005 |

OTHER PUBLICATIONS

D.E. Bugner and C. Suminski, "Filtration and Reciprocity Effects on the Fade Rate of Inkjet Photographic Prints", Proceedings of IS&T's NIP16: International Conference on Digital Printing Technologies, Vancouver, BC, Oct. 2000.

* cited by examiner

Primary Examiner—Helene Klemanski
(74) Attorney, Agent, or Firm—Lynne M. Blank; Arthur E. Kluegel

(57) ABSTRACT

The invention relates to monoazo colorants derived from pyrazolobenzodiazinedioxides of Formula 1:

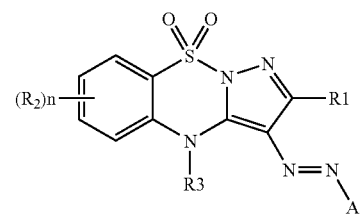

wherein $R_1$ and $R_2$ are hydrogen or any non-metallic group, n is 0-4, $R_3$ is hydrogen, acyl, aryl, alkenyl, alkynyl or alkyl, A represents an aromatic heterocyclic ring or an aromatic group of Formula 2:

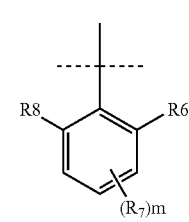

wherein $R_6$ and $R_8$ are hydrogen, alkyl, sulfonic acid, or 1-4 carbon alkoxy, $R_7$ is any non-metallic group, m is 0-3, and $R_6$ and $R_7$, $R_7$ and $R_8$, or, when m>1, two $R_7$ groups can be joined to form a fused carbocyclic or heterocyclic aromatic or non-aromatic ring. The invention also relates to an aqueous ink that comprises at least one colorant of Formula 1:

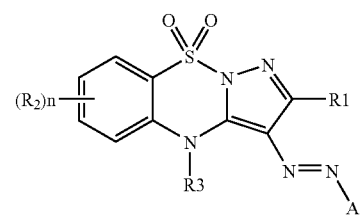

wherein A represents an aromatic or heteroaromatic ring, and A can be bonded to other rings that can be aromatic, aliphatic or heterocyclic, and an ink printing method using the colorant-containing ink.

20 Claims, No Drawings

MONOAZO COLORANTS FROM PYRAZOLOBENZODIAZINEDIOXIDES

FIELD OF THE INVENTION

The present invention relates to new colorants and their use in inks, particularly inkjet inks.

BACKGROUND OF THE INVENTION

Inkjet printing is a non-impact method for producing images by the deposition of ink droplets in a pixel-by-pixel manner to an image recording element in response to digital signals. There are various methods that may be utilized to control the deposition of ink droplets on the image recording element to yield the desired image. In one process, known as continuous inkjet, a continuous stream of droplets is charged and deflected in an imagewise manner onto the surface of the image recording element, while unimaged droplets are caught and returned to an ink sump. In another process, known as drop-on-demand inkjet, individual ink droplets are projected as needed onto the image recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various inkjet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, and ketones. Aqueous-based ink compositions are preferred because they are more environmentally friendly as compared to solvent-based inks, plus most print heads are designed for use with aqueous-based inks.

Materials used in inkjet printing inks must have the correct properties to provide an ink which is stable, possesses good printing properties and provides an image with good color, sharpness and image stability. The ink composition may be colored with pigments, dyes, polymeric dyes, loaded-dye/latex particles, or any other types of colorants, or combinations thereof. The ink composition may be yellow, magenta, cyan, black, gray, red, violet, blue, green, orange, and brown. Many colorants are known and used in inkjet printing inks. Many have some or most of these desirable properties but it is very difficult to find a colorant which possesses all of the above attributes. Inkjet inks generally contain a dye that is soluble in an ink vehicle such as water or a mixture composed of water and a known water soluble or water miscible organic solvent. Water solubility of these dyes is due to the incorporation of negatively charged substituent groups such as sulfo or carboxy. Colorants are degraded by ozone and light and their stability with regard to these two agents can differ depending on media and ink composition. There is a great need to develop dye-based inks that have high optical densities on receivers and also superior light fastness and colorfastness when printed on different types of media, in particular, fast drying or porous media as well as plain paper.

The colorants currently in commercial aqueous ink formulations are less than optimal in one property or another. They are used because they achieve an acceptable but not superior balance of features. Some examples of such dyes are Direct yellow 132 (CAS 10114-86-0) and Direct yellow 86 (CAS 50295-42-3), acid yellow 23 (CAS 1934-21-0) and acid yellow 17 (CAS 6359-98-4) which have good hue and ozone fastness, but poor light stability. U.S. Pat. Nos. 6,468,338 and 6,464,767, incorporated herein by reference, disclose water-soluble azoindole dyes for use in inkjet printing including dyes derived from diazotizable heteroaromatic amines. Dyes suitable for use in inkjet inks include those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, antaraquinone dyes, anthrapyridone dyes, azo dyes, rhodamine dyes, solvent dyes and the like. Some other water soluble dyes include Acid Red 52; azo-naphthol dyes, such as Acid Red 249, Direct Red 227 or Reactive Red 31; azo-aniline dyes; azo-thiazole dyes; arylazonaphthylamine dyes, such as Direct Red 75 or Ilford M-377; metal-complex azo dyes, such as Reactive Red 23, CAS Registry No. 347417-99-6 or any of the dyes described in U.S. Pat. No. 6,001,161 and anthrapyridone dyes, such as Acid Red 80 and 82

While glossy, porous media have the ability to absorb high concentrations of ink instantly, they suffer from image fastness problems, such as fading due to exposure to radiation by daylight, tungsten light, fluorescent light, or ozone, as described by D. E. Bugner and C. Suminski, "Filtration and Reciprocity Effects on the Fade Rate of Inkjet Photographic Prints", Proceedings of IS&T's NIP16: International Conference on Digital Printing Technologies, Vancouver, BC, October 2000. It is believed that the poor image fastness may be attributed to the greater permeability of the porous image receiving layers (IRL's) to oxygen and/other airborne reactants such as ozone. Porous media is important because such fast drying media is becoming more and more popular and while most colorants are stable on gel-based or swellable media, porous media are more stringent in their demand for a high level of stability. It is also important for colorants to perform well on all grades of plain paper. Plain paper is used by most consumers in home inkjet printers.

Pigments are used in inkjet printing in an effort to solve some of the problems present with dye-based inks. Pigments generally have better stability to light and ozone than dyes. The physical properties of the pigment present a new group of challenges. The pigment particles must be very small in order to give good transparency and high density when printed. This is often achieved by grinding or milling the pigment in the presence of a suitable dispersant. The pigment must have very low solubility in the ink formulation and must not be prone to clumping or particle growth, or poor jetting behavior will result. It is often hard to tailor the hue of a pigment to that which is desired because the physical properties of the intermolecular array, formed by the interaction of the individual pigment molecules with each other, often overwhelm the electronic effect of the substituents on the individual molecules. Hue is also affected by crystal morphology and particle size distribution. It is often hard to control these features without extensive trial and error experimentation with each pigment to find the preparation conditions and or the post treatment that imparts the desired property. A wide variety of organic and inorganic pigments, alone or in combination with additional pigments or dyes, may be used in the ink composition of the present invention. Pigments that may be used in the invention include those disclosed in, for example, U.S. Pat. Nos. 5,026,427; 5,086,698; 5,141,556; 5,160,370; and 5,169,436, all incorporated herein by reference. The exact choice of pigments will depend upon the specific application and performance requirements such as color reproduction and image stability.

Pigments suitable for use in inkjet inks include, but are not limited to, azo pigments, monoazo pigments, disazo pigments, azo pigment lakes, β-Naphtho pigments, Naphthol AS pigments, benzimidazolone pigments, disazo condensation pigments, metal complex pigments, isoindolinone and isoindoline pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Although many classes of pigments are known, the producers of inkjet inks tend to limit their pigment choices to a relatively small subset of pigments that are commercially available at high purity and that behave well in the ink formulation.

GB988972 discloses fabric dyes comprising aromatic azo dyes bearing an aryl group with an ortho substituent capable of complexing to a metal atom. GB988972 does not disclose aromatic azo dyes incapable of forming a metal complex at that substituent site or which are heterocyclic and which are also useful in inks.

PROBLEM TO BE SOLVED

There remains a need to identify and select those colorants that are useful in producing a high quality image with desired hue and good stability, and that can be formulated into an ink that performs well in the inkjet printing method of choice.

SUMMARY OF THE INVENTION

The present invention relates to a colorant of Formula 1:

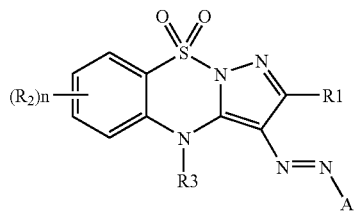

wherein:
$R_1$ and $R_2$ are hydrogen or any non-metallic group;
n is an integer of from 0-4;
$R_3$ is hydrogen, acyl, aryl, alkenyl, alkynyl or alkyl;
A represents a substituted or unsubstituted aromatic heterocyclic ring or an aromatic group of Formula 2:

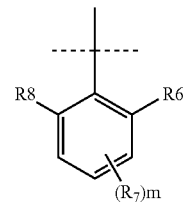

wherein:
$R_6$ and $R_8$ are each independently hydrogen, alkyl, sulfonic acid, or 1-4 carbon alkoxy;
$R_7$ is any non-metallic group;
m is an integer from 0-3; and
$R_6$ and $R_7$, $R_7$ and $R_8$, or, when m>1, two $R_7$ groups are capable of being joined to form a fused carbocyclic or heterocyclic aromatic or non-aromatic ring that can be further substituted.

The present invention also relates to an aqueous ink that comprises at least one colorant of Formula 1:

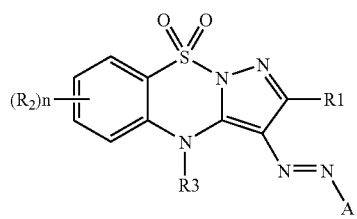

wherein:
$R_1$ and $R_2$ are hydrogen or any non-metallic group;
n is an integer of from 0-4;
$R_3$ is hydrogen, acyl, aryl, alkenyl, alkynyl or alkyl;
A represents a substituted or unsubstituted aromatic or heteroaromatic ring; and
A is capable of being fused to or bonded to another ring or rings that can be aromatic, aliphatic or heterocyclic, and an ink printing method for creating an image or an ink compatible substrate comprising:
a. providing an apparatus with individually addressable nozzles capable of depositing drops of ink onto an ink compatible substrate;
b. loading said apparatus with an ink compatible substrate;
c. loading said apparatus with at least one ink containing a colorant of Formula 1 to be printed by said apparatus:

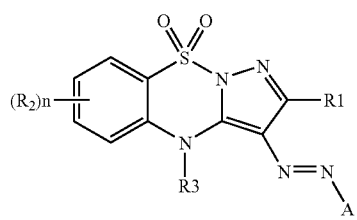

wherein:
R₁ and R₂ are hydrogen or any non-metallic group;
n is an integer of from 0-4;
R₃ is hydrogen, acyl, aryl, alkenyl, alkynyl or alkyl;
A represents a substituted or unsubstituted aromatic or heteroaromatic ring;
A is capable of being fused to or bonded to another ring or rings that can be aromatic, aliphatic or heterocyclic; and
d. printing on said ink compatible substrate using said at least one ink containing a colorant of Formula 1.

ADVANTAGEOUS EFFECT OF THE INVENTION

The new classes of dyes and pigments demonstrate utility in inks and provide the ink maker with more choices in terms of hue, compatibility with the other elements in the ink formulation and ink ejection device, and increases the probability that a colorant with properties closely matched to the performance requirements of a particular application will be found. The inventive colorants provide ozone fastness and light stability.

DETAILED DESCRIPTION OF THE INVENTION

This invention provides an ink composition comprising a colorant represented by Formula 1:

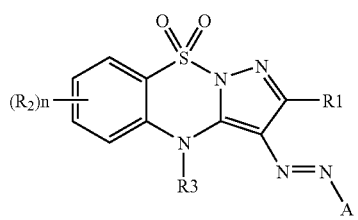

wherein $R_1$ and $R_2$ may be hydrogen or any non-metallic group; n may be 0-4.

$R_3$ may be hydrogen, acyl, aryl, alkenyl, alkynyl or alkyl. Some examples of suitable substituent groups for $R_3$ are: formyl, acetyl, benzoyl, phenyl, substituted phenyl, methyl, ethyl, propyl, butyl, and allyl.

A represents a substituted or unsubstituted aromatic heterocyclic ring; or A may be an aromatic group of Formula 2:

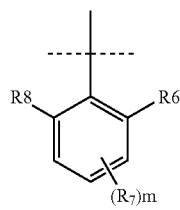

where $R_6$ and $R_8$ may each independently be hydrogen, alkyl, sulfonic acid, or 1-4 carbon alkoxy; $R_7$ may be any non-metallic group; m is an integer from 0-3; $R_6$ and $R_7$, $R_7$ and $R_8$, or, when m>1, two $R_7$ groups may be joined to form a fused carbocyclic or heterocyclic aromatic or non-aromatic ring that can be further substituted.

This invention further provides inks for printing wherein the ink contains a colorant of Formula 1:

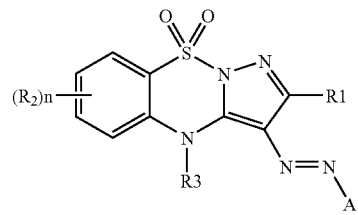

wherein $R_1$ and $R_2$ may be hydrogen or any non-metallic group; n may be 0-4; $R_3$ may be hydrogen, acyl, aryl, alkenyl, alkynyl or alkyl. Some examples of suitable substituent groups for $R_3$ are: formyl, acetyl, benzoyl, phenyl, substituted phenyl, methyl, ethyl, propyl, butyl, allyl. A represents a substituted or unsubstituted aromatic or heteroaromatic ring. A may be fused to or bonded to another ring or rings that can be aromatic, aliphatic or heterocyclic.

The colorant may be soluble or insoluble in the ink formulation.

Some examples of suitable heterocycles for A are shown in Table 1. The point of attachment of the azo group is designated by:

TABLE 1

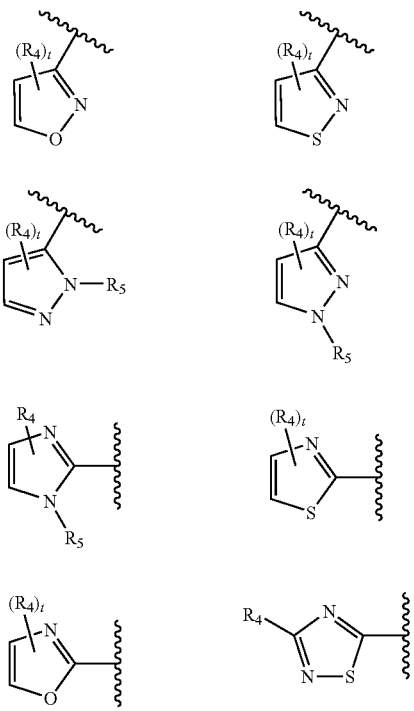

TABLE 1-continued

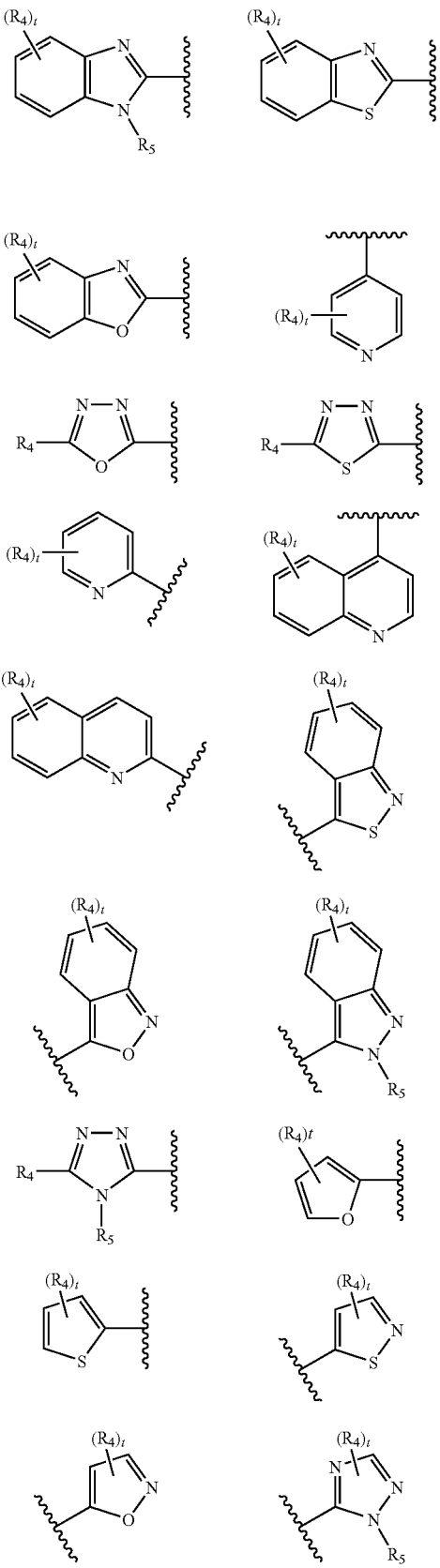

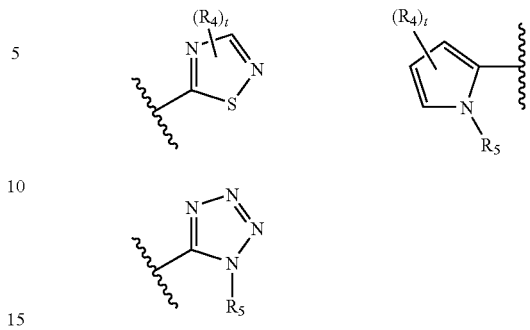

wherein t may be 0-4.

$R_1$ and $R_2$ and $R_4$ may be hydrogen or any non-metallic group. Some examples of suitable substituent groups for $R_1$ and $R_2$ and $R_4$ are hydrogen, any halogen, hydroxy, alkoxy, aryloxy, alkyl, alkenyl, alkynyl, aryl, acyl, carboxyl carboalkoxy, carbonate, carbamate, thio, thioalkyl or thioaryl, sulfo, sulfenyl, sulfone, sulfamoyl, sulfonamido, nitro, amino, substituted amino, amido, carbamoyl, and cyano. $R_3$ and $R_5$ can be hydrogen, acyl, aryl, alkenyl, alkynyl or alkyl. Some examples of suitable substituent groups for $R_3$ and $R_5$ are: formyl, acetyl, benzoyl, phenyl, substituted phenyl, methyl, ethyl, propyl, butyl, allyl.

Typical substituted benzene ring groups for ring A are phenyl, 3-chlorophenyl, 4-methoxyphenyl, 4-sulfophenyl, 3-sulfophenyl, 2,5-disulfophenyl, 4-carboxyphenyl, 2-methyl-4-sulfophenyl, 3-chloro-4-sulfophenyl, 3,4-dicarboxyphenyl, and the like. The preferred heterocycles for A are phenyl, pyrazolo, isothiazolo, imidazolo, thiazolo, thiadiazolo, benzothiazolo, and benzisothiazolo. The most preferred are phenyl, pyrazolo, isothiazolo, and thiadiazolo. The most preferred structures from Table 1 are:

TABLE 5

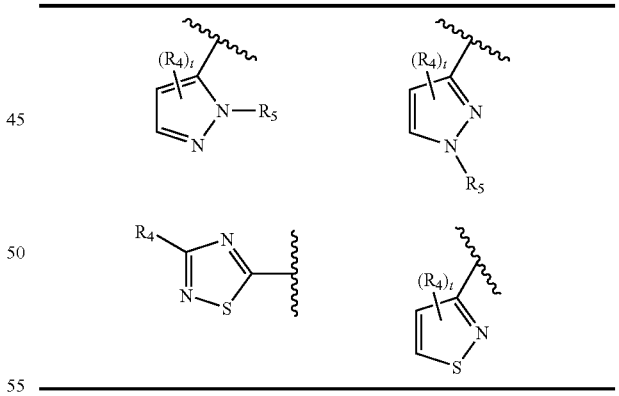

Unless otherwise specifically stated, use of the term "substituted" or "substituent" means any group or atom other than hydrogen. Additionally, unless specifically stated otherwise, whenever a substituent comprises a substitutable hydrogen, it is intended that the substituent encompasses not only the substituent's unsubstituted form, but also its form further substituted with any substituent group or groups as herein mentioned, so long as the substituent group does not destroy properties necessary for inkjet utility.

Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy, aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrroin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1-(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituent groups may themselves be further substituted one or more times with the described substituent groups. The particular substituents used may be selected by those skilled in the art to attain the desired colorant properties for a specific application and can include, for example, hydrophobic groups, solubilizing groups, blocking groups, and releasing or releasable groups. When a molecule has two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The colorant may bear any number of groups that are ionizable and in these instances the groups may be associated with one or more suitable counterions. Examples of some typical counterions are lithium, sodium, potassium, ammonium, and trialkylammonium.

The colorant may be soluble or insoluble in the ink formulation. Most preferably, the inventive colorant of Formula 1 is a yellow colorant. For the purpose of discussion, the colorants that are insoluble in the working formulation may be referred to as pigments and the soluble ones may be referred to as dyes.

To use the colorants of the invention, they must have either adequate water solubility to enable preparation of an ink containing between 0.1 and 10% dissolved dye, or the colorant must have sufficient insolubility to form microparticulate dispersions that can be formulated into ink containing between about 0.1-10% pigment and be jetted through the inkjet printhead without problems.

Full color inkjet printing normally employs a set of at least three primary inks—cyan, magenta and yellow. In addition, black, orange, red, blue and green inks and lower strength formulations of the primary inks may be used to provide improved image quality. Inks containing the colorants of this invention may be used in combination with inks containing other dyes and pigments useful for inkjet printing.

The ink of the invention may be utilized in any ink printing process. Although preferred for inkjet use, it also could be used for any printing or writing process using ink. Typical of such processes are pen plotters and pens. In general, the above colorants comprise from about 0.1 to about 10%, preferably from about 1 to about 8% by weight of the inkjet ink composition.

Examples of the colorants of the invention include, but are not limited to, those in Table 2.
TABLE 2
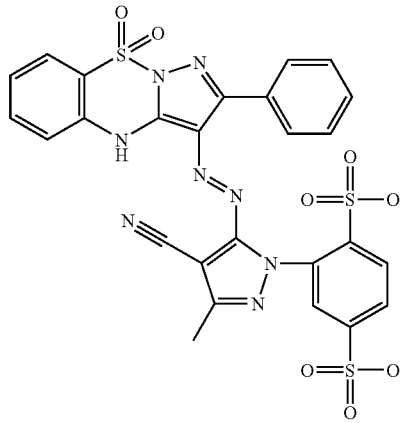
I-1
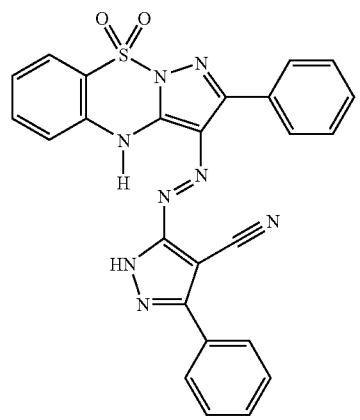
I-2
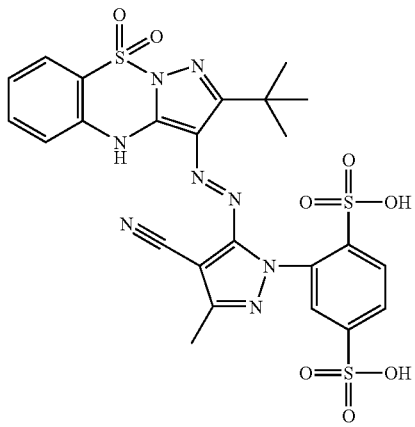
I-3
TABLE 2-continued
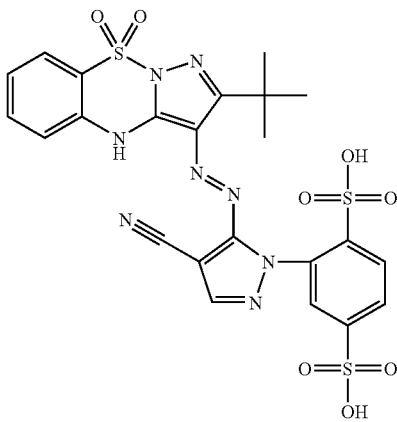
I-4
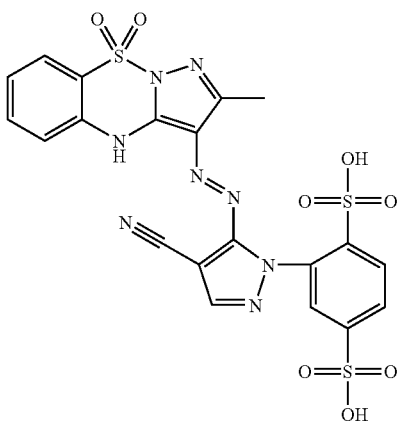
I-5
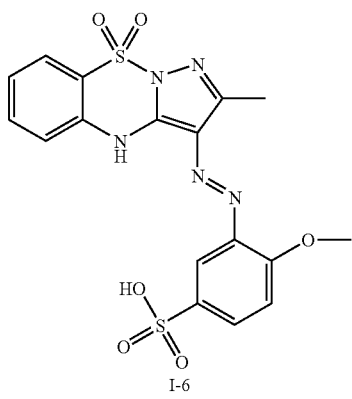
I-6
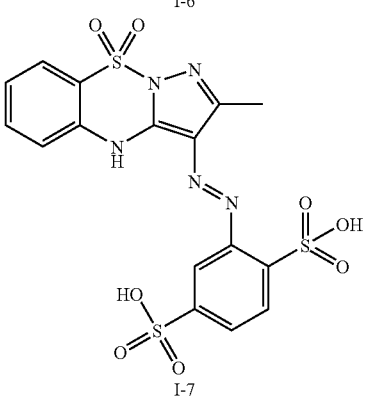
I-7

TABLE 2-continued
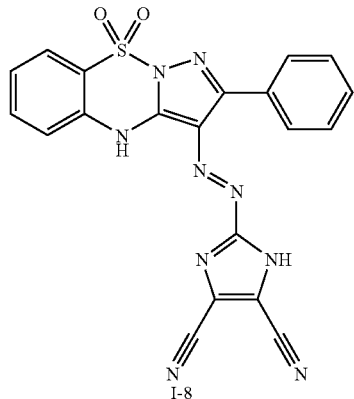
I-8
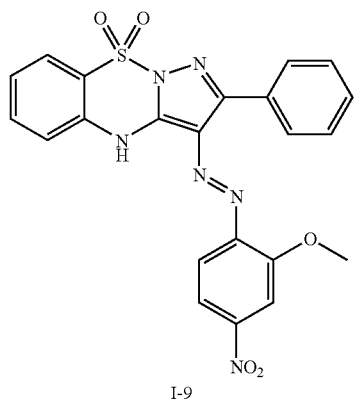
I-9
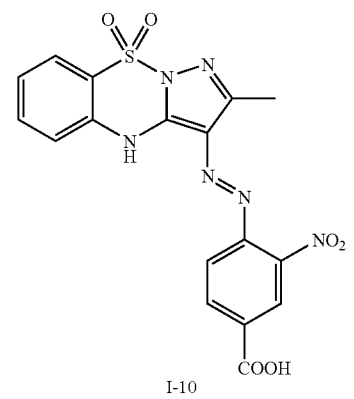
I-10
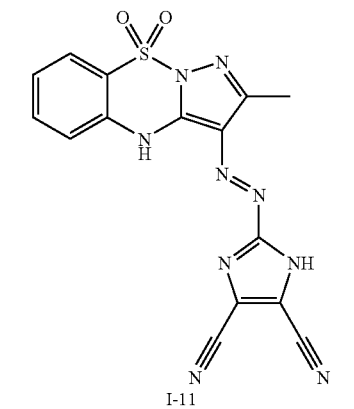
I-11
TABLE 2-continued
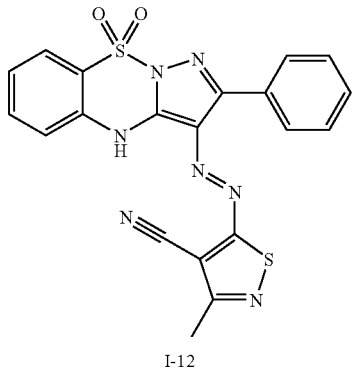
I-12
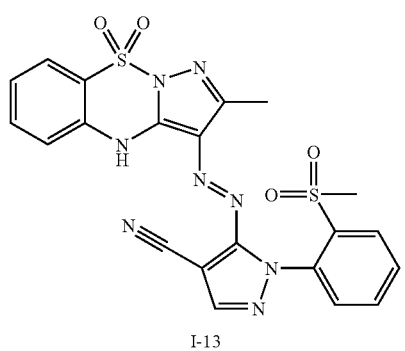
I-13
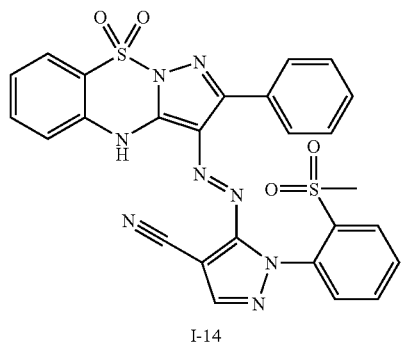
I-14
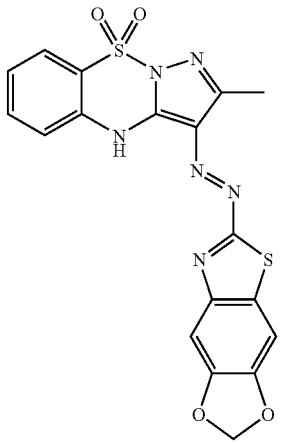
I-15

TABLE 2-continued
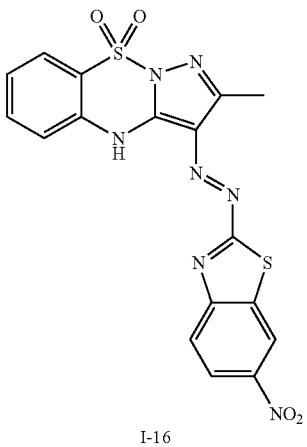
I-16
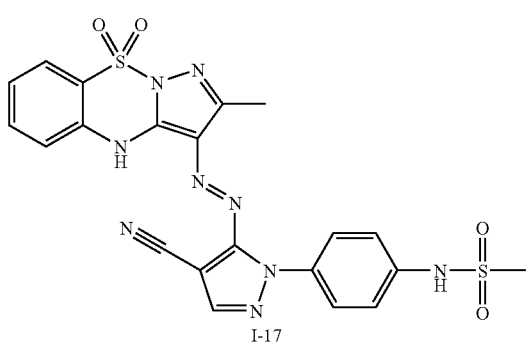
I-17
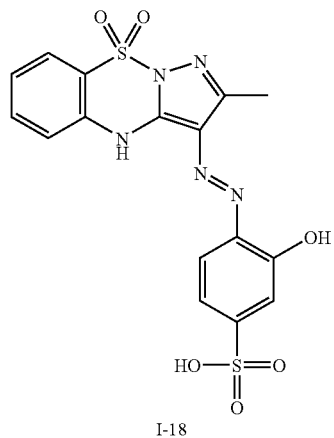
I-18
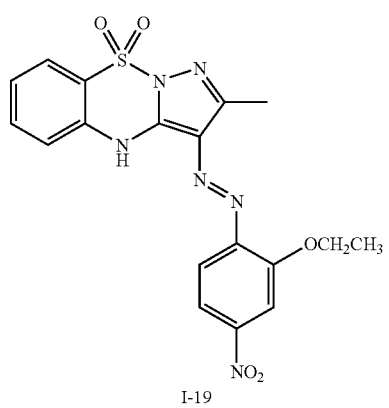
I-19
TABLE 2-continued
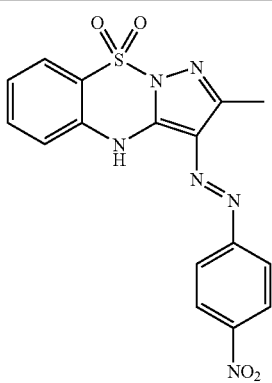
I-20
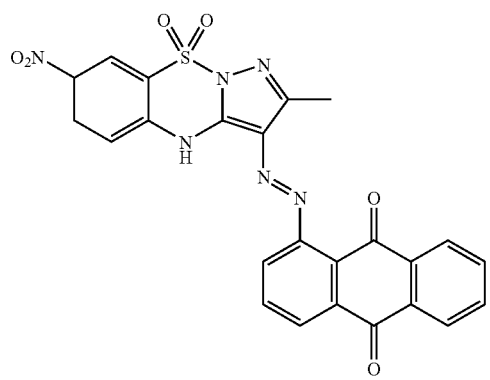
I-21
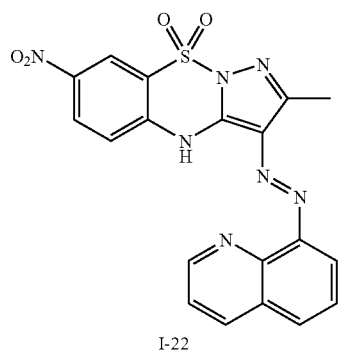
I-22
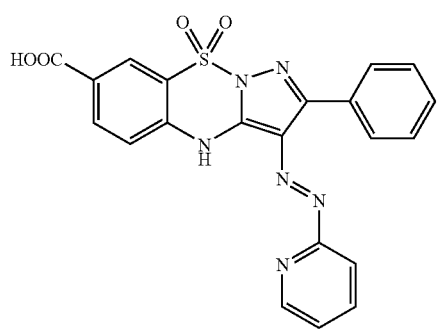
I-23

TABLE 2-continued

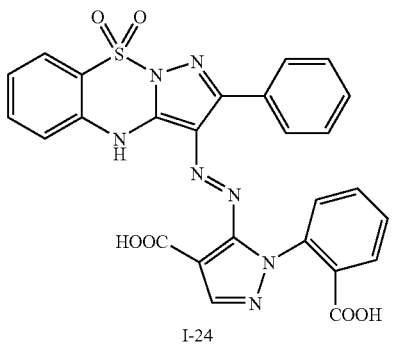

I-24

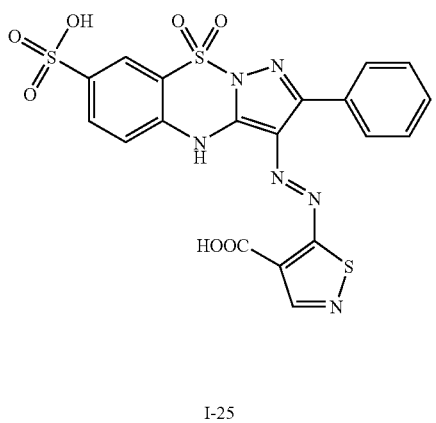

I-25

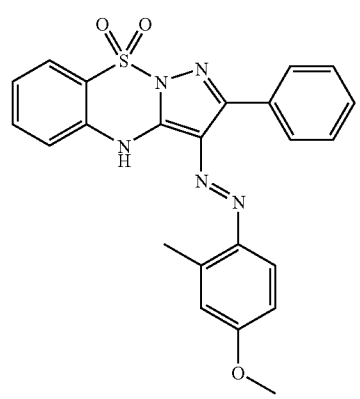

I-26

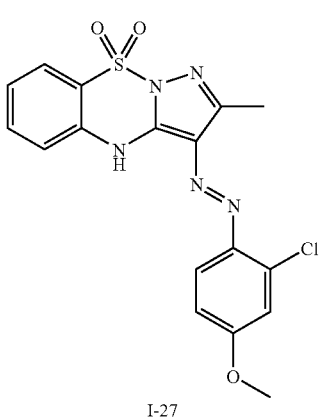

I-27

TABLE 2-continued

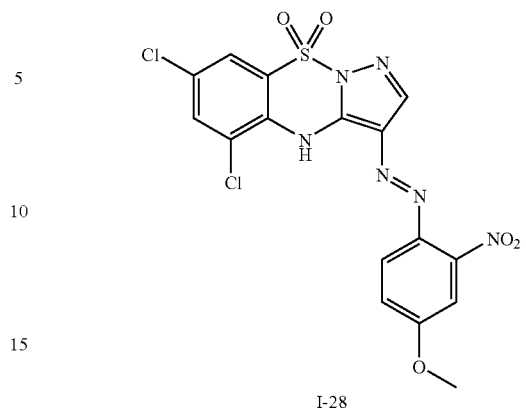

I-28

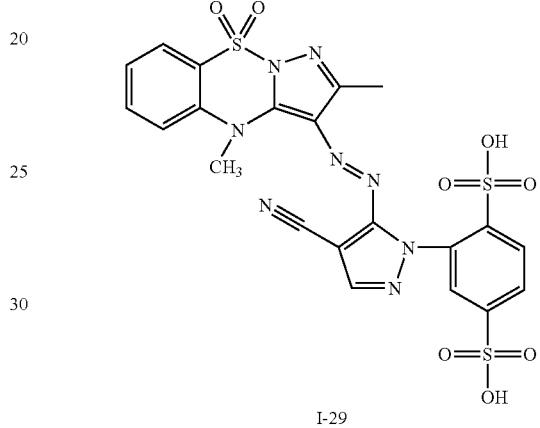

I-29

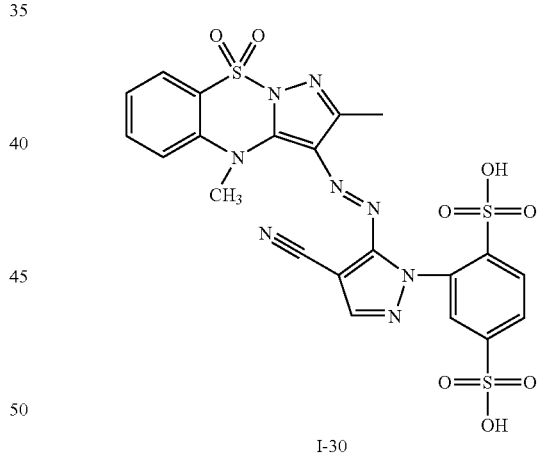

I-30

Pigment-based ink compositions useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, an air-jet mill, an attritor, or a liquid interaction chamber. In the milling step (a), pigments are optionally suspended in a medium which is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231, incorporated herein by reference. Milling media are removed from either the pigment dispersion obtained in step (a) or from the ink composition obtained in step (b).

A dispersant (or dispersing aid) is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. Nos. 5,679,138, 5,651,813 or 5,985,017, incorporated herein by reference. Such dispersing aids are typically used at 10-70% of the weight of the colorant in Formula 1.

Polymeric dispersants are also known and useful in aqueous pigment-based ink compositions. Polymeric dispersants may be added to the pigment dispersion prior to, or during the milling step (a), and include polymers such as homopolymers and copolymers, anionic, cationic or nonionic polymers, or random, block, branched or graft polymers. Polymeric dispersants useful in the milling operation include random and block copolymers having hydrophilic and hydrophobic portions, see, for example, U.S. Pat. Nos. 4,597,794; 5,085,698; 5,519,085; 5,272,201; 5,172,133; or 6,043,297, incorporated herein by reference; and graft copolymers, see, for example, U.S. Pat. Nos. 5,231,131; 6,087,416; 5,719,204; or 5,714,538, incorporated herein by reference.

Composite colorant particles having a colorant phase and a polymer phase are also useful in aqueous pigment-based inks of the invention. Composite colorant particles are formed by polymerizing monomers in the presence of pigments, see, for example, U.S. patent Ser. Nos. 10/446,013; 10/446,059; or 10/665,960, all incorporated herein by reference. Microencapsulated-type pigment particles are also useful and consist of pigment particles coated with a resin film, see, for example, U.S. Pat. No. 6,074,467.

Aqueous pigment-based ink compositions of the invention may also contain self-dispersed colorants in which the surfaces of pigment particles are chemically functionalized such that a separate dispersant is not necessary, see, for example, U.S. Pat. Nos. 6,494,943 B1 and U.S. Pat. No. 5,837,045, incorporated herein by reference. Also useful in the invention are polymeric dyes or loaded-dye/latex particles. Examples of polymeric dyes are described in U.S. Pat. No. 6,457,822 B1, incorporated herein by reference, and references therein. Examples of loaded-dye/latex particles are described in U.S. Pat. No. 6,431,700 B1 and U.S. patent application Ser. Nos. 10/393,235; 10/393,061; 10/264,740; 10/020,694; and 10/017,729, all incorporated herein by reference.

The colorants used in the ink composition of the invention may be present in any effective amount, generally from 0.1 to 10% by weight, and preferably from 0.5 to 6% by weight, but should contain sufficient colorant to give good density when printed. Inks containing water soluble dyes typically contain from 0.1 to 10% dye, preferably between 1 to 8% by weight. The dye must have sufficient solubility in the ink so as not to form crystals or precipitate upon storage. The dyes may be present in protonated or ionized form and if ionized, they may be associated with a suitable counter ion. Examples of suitable counterions include lithium, sodium, potassium, ammonium, or tetraalkyl ammonium.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178, incorporated herein by reference, describes the use of inorganic particles in pigment-based inks in order to improve optical density and rub resistance of the pigment particles on the image recording element. In another example, U.S. Pat. No. 6,508,548 B2, incorporated herein by reference, describes the use of a water-dispersible polymeric latex in dye-based inks in order to improve light and ozone resistance of the printed images. The polymeric particles are often referred to as binders in the art of inkjet ink compositions.

The ink composition may contain non-colored particles such as inorganic or polymeric particles in order to improve gloss differential, light and/or ozone resistance, waterfastness, rub resistance and various other properties of a printed image, see, for example, U.S. Pat. Nos. 6,598,967 B1 or 6,508,548 B2, incorporated herein by reference. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper, see, for example, U.S. Pat. Nos. 5,866,638 or 6,450,632 B1, incorporated herein by reference. Colorless inks are also used to provide an overcoat to a printed image, usually in order to improve scratch resistance and waterfastness, see, for example, U.S. Pat. Publ. No. 2003/0009547 A1 or E.P. 1,022,151 A1, incorporated herein by reference. Colorless inks are also used to reduce gloss differential in a printed image, see, for example, U.S. Pat. No. 5,604,819 B2; U.S. Pat. Publ. Nos. 2003/0085974 A; 2003/0193553 A1; or 2003/0189626 A1, incorporated herein by reference.

Examples of inorganic particles useful in the invention include, but are not limited to, alumina, boehmite, clay, calcium carbonate, titanium dioxide, calcined clay, aluminosilicates, silica, or barium sulfate.

For aqueous-based inks, polymeric particles useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (S. C. Johnson Co.), Ucar™ (Dow Chemical Co.), Jonrez® (Mead-Westvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes, such as the Witcobonds® from Witco. These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.1 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyvinyl pyrrolidones, carboxy methyl cellulose, polyethyloxazolines, polyethyleneimines, polyamides and alkali soluble resins; polyurethanes, such as those found in U.S. Pat. No. 6,268,101; polyacrylic acids, styrene-acrylic methacrylic acid copolymers, such as Joncryl® 70 from S. C. Johnson Co., TruDot™ IJ-4655 from MeadWestvaco Corp., and Vancryl® 68S from Air Products and Chemicals, Inc.

Ink compositions useful in the invention include humectants and/or co-solvents in order to prevent the ink composition from drying out or crusting in the nozzles of the printhead, aid solubility of the components in the ink composition, or facilitate penetration of the ink composition into the image recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and dialkyl ethers derived from the polyhydric alcohols, such as ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%. Water-miscible organic solvents at a level of 5-40% by weight are useful.

Surfactants may be added to adjust the surface tension of the ink to an appropriate level. The surfactants may be anionic, cationic, amphoteric or nonionic and used at levels of 0.01 to 5% of the ink composition. Examples of suitable nonionic surfactants include, linear or secondary alcohol ethoxylates, such as the Tergitol® 15-S and Tergitol® TMN series available from Union Carbide and the Brij® series from Uniquema; ethoxylated alkyl phenols, such as the Triton® series from Union Carbide; fluoro surfactants, such as the Zonyls® from DuPont, and the Fluorads® from 3M; fatty acid ethoxylates, fatty amide ethoxylates, ethoxylated and propoxylated block copolymers, such as the Pluronic® and Tetronic® series from BASF, ethoxylated and propoxylated silicone based surfactants, such as the Silwet® series from CK Witco; alkyl polyglycosides, such as the Glucopons® from Cognis and acetylenic polyethylene oxide surfactants, such as the Surfynols from Air Products.

Examples of anionic surfactants include carboxylated, such as ether carboxylates and sulfosuccinates; sulfated, such as sodium dodecyl sulfate; sulfonated, such as dodecyl benzene sulfonate, alpha olefin sulfonates, alkyl diphenyl oxide disulfonates, fatty acid taurates and alkyl naphthalene sulfonates; phosphated, such as phosphated esters of alkyl and aryl alcohols, including the Strodex® series from Dexter Chemical; phosphonated and amine oxide surfactants and anionic fluorinated surfactants. Examples of amphoteric surfactants include betaines, sultaines, and aminopropionates. Examples of cationic surfactants include quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide may be added to an inkjet ink composition to suppress the growth of micro-organisms such as molds, and fungi in aqueous inks. A preferred biocide for an ink composition is Proxel® GXL (Zeneca Specialties Co.) at a final concentration of 0.0001-0.5 wt. %.

Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

The exact choice of ink components will depend upon the specific application and performance requirements of the printhead from which they are jetted. Thermal and piezoelectric drop-on-demand print heads and continuous print heads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP. Acceptable surface tensions are no greater than 60 dynes/cm, and preferably in the range of 28 dynes/cm to 45 dynes/cm.

The inkjet inks provided by this invention may be employed in inkjet printing wherein liquid ink drops are applied in a controlled fashion to an ink receptive layer substrate, by ejecting ink droplets from a plurality of nozzles or orifices of the print head of an inkjet printer. The inks are suitable for use with any of the common inkjet heads for ejecting ink droplets in either drop-on-demand or continuous modalities.

The inks of the invention may be used with any inkjet receiver substrate. Ink-receptive substrates useful in inkjet printing are well known to those skilled in the art. Representative examples of such substrates are disclosed in U.S. Pat. Nos. 5,605,750; 5,723,211; and 5,789,070 and EP 813 978

A1, all incorporated herein by reference. The inks may be used with plain paper as well as other receivers.

An inkjet recording element typically comprises a support having on at least one surface thereof an ink-receiving or image-receiving layer, and includes those intended for reflection viewing, which have an opaque support, and those intended for viewing by transmitted light, which have a transparent support.

In addition to plain paper, there are generally two types of ink-receiving layers (IRL's). The first type of image receiving layer (IRL) comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of image receiving layer (IRL) comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the image receiving layer (IRL) to obtain a print which is instantaneously dry to the touch.

Inks containing the colorants of this invention may be used in ink sets in combination with inks containing other dyes and pigments useful for inkjet printing. Dyes useful for inkjet printing are normally water soluble dyes of the Acid, Direct, Reactive or Basic Color Index classifications. Typically ink sets may comprise magenta and cyan inks along with the yellow ink, but may also include one or more black inks, lower strength (light) yellow, magenta and cyan inks and alternate color inks such as orange, red, blue, and green. Typical cyan dyes may be copper phthalocyanine derivatives such as Direct Blue 199 and 86; triarylmethane dyes, such as Acid Blue 9; azo, metal-complex azo, metal-complex formazan or anthraquinone dyes. Typical magenta dyes may be xanthene dyes, such as Acid Red 52; azo-naphthol dyes, such as Acid Red 249, Direct Red 227 or Reactive Red 31; azo-aniline dyes; azo-thiazole dyes; arylazonaphthylamine dyes, such as Direct Red 75 or Ilford M-377; metal-complex azo dyes, such as Reactive Red 23, CAS Registry No. 347417-99-6 or any of the dyes described in U.S. Pat. No. 6,001,161, incorporated herein by reference; anthrapyridone dyes, such as Acid Red 80 and 82; or anthraquinone dyes. Typical black dyes that are useful for inkjet printing include polyazo dyes, such as Food Black 2, Direct Black 22 or Direct Black 19; metal-complex polyazo dyes, such as Reactive Black 31, Pacified Reactive Black 31 or Ilford K-1334; sulfur black dyes or aniline black dyes.

Pigments suitable for use with colorants of the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Some specific examples of useful pigments are C.I. Pigment Blue 15:3, C.I. Pigment Red 122, C.I. Pigment Red 177, C.I. Pigment Red 202, C.I. Pigment Yellow 155, C.I. Pigment Yellow 74, C.I. Pigment Yellow 158, C.I. Pigment Violet 19, C.I. Pigment Violet 23, C.I. Pigment Black 7.

Preparation of Inventive Coroants

Background synthesis methodology relating to the coupler precursors to the colorants of the invention may be generally described in U.S. Pat. No. 5,024,930 (col. 19 lines 24- 68, as well as the literature reference to the Journal of Heterocyclic Chemistry at col. 19, line 27), incorporated herein by reference. Colorants of the present invention are prepared in a manner similar to the general method described in GB988972 for making the previously known metal complex dyes.

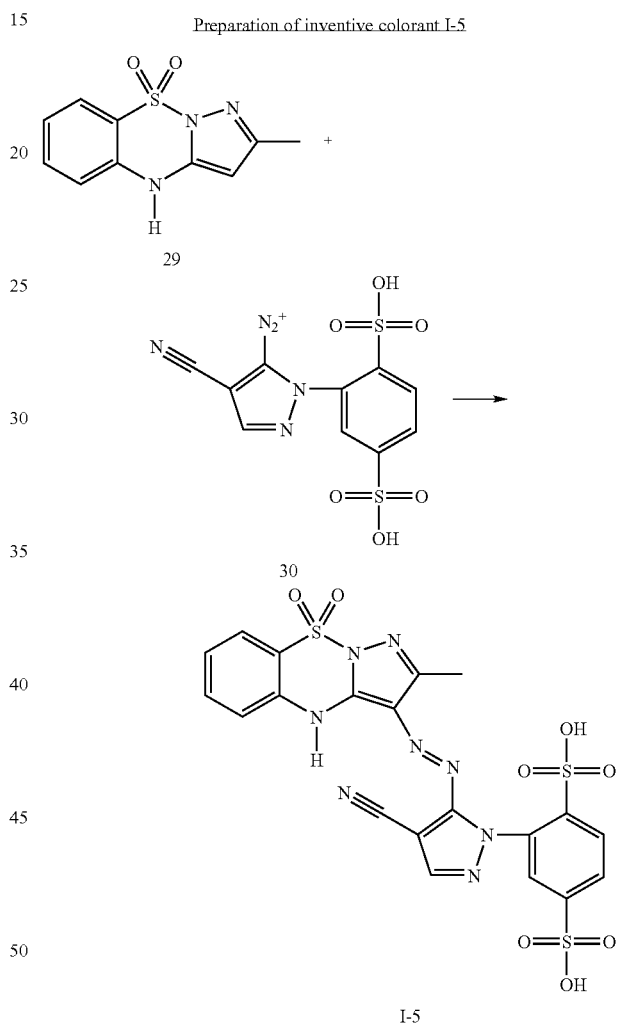

Preparation of inventive colorant I-5

The requisite diazonium 30 was prepared by addition of a slurry of 1.2 equivalents of the amine precursor in 10 parts (relative to the amine) 1:5 propionic acid: acetic acid to a stirred mixture of 1 part sulfuric acid, 1 part 1:5 acid and 1.1 equivalents (relative to amine) of 40% wt/wt nitrosylsulfuric acid in sulfuric acid at 0° C. The resulting thick tan solution was stirred for two hours at 0-5° C.

The coupler was dissolved in a mixture of THF (approx. 10 parts wt/vol relative to amine) and 1:5 acid (approx. 10 parts wt/vol relative to amine) and cooled in ice for 10 minutes. With rapid stirring, the diazonium reaction mixture was poured in one stream into the coupler solution. The temperature rose to 5° C. The orange reaction mixture was allowed to come to room temperature slowly. The reaction mixture was diluted with brine and the layers separated. The upper colorant-containing layer was evaporated to a solid. The solid was dissolved in saturated bicarbonate solution and then washed with ethyl acetate to remove neutral impurities. The bicarbonate solution containing the colorant was subjected to preparative HPLC for purification to provide 3.3 gm (47% yield) of pure product.

Preparation of Inventive colorant I-11

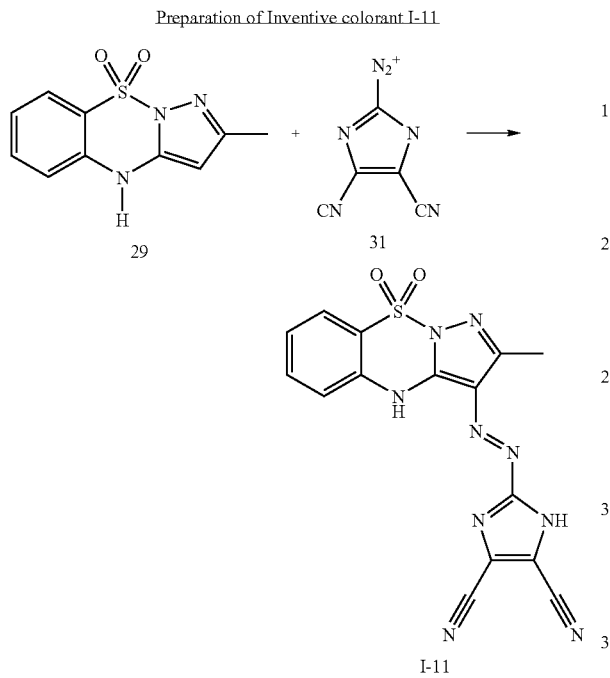

The requisite amine, 2-amino-4, 5 imidazole dicarbonitrile, (0.01 mole) was placed in dilute HCl (10 ml water/3 ml HCl) and cooled to 5° C. To this was added a solution of $NaNO_2$ (0.72 g) in water (2 ml) slowly. The solution was stirred about 2 hours, then a small amount of urea was added and the mixture containing diazonium 31 was stirred 10 minutes.

The coupler 29 (0.01 mole) was dissolved in warm MeOH (200 ml) and NaOAc (15 g) with vigorous stirring, the diazonium solution was added, stirred about 1 hour. The precipitated pigment was diluted with water (500 ml), stirred, filtered, stirred in hot water (200 ml), filtered hot and oven dried. The material was recrystalized from NMP, NMP/EtOAc, toluene/NMP or acetone to provide the pigment I-11 in 58% yield.

Preparation of Inventive colorant I-12

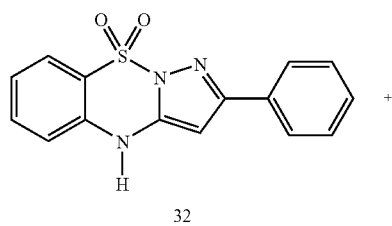

-continued

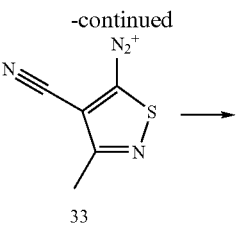

Sodium nitrite (0.01 mole) was dissolved in warm conc. $H_2S)_4$ (10 g) and then cooled to room temperature. To this was added 1:5 acid (30 ml) [1 part propionic acid/5 parts acetic acid]. The solution was cooled to 5° C. before addition of the amine (0.01 mole) in small portions. The mixture, containing diazonium 33, was stirred about 2 hours, a small amount of urea was added and the mixture was stirred 10 minutes.

The coupler 32 (0.01 mole) was dissolved in warm MeOH/THF (400 ml 50 ml) and NaOAc (15 g) with vigorous stirring. The diazonium mixture was added, and the reaction stirred about 1 hour. The solid reaction product was isolated by filtration after dilution with water (500 ml). The product was stirred in hot water (200 ml), filtered hot, and oven dried. Pigment I-12 was then recrystallized from hot NMP and oven dried to provide the pigment in 58% yield.

Preparation of Inks

Preparation of Inventive Ink S-1 Containing Soluble Dye I-4

Dye I-4, 0.455 g was dissolved in 4.545 g distilled water and 5 g of a solution of 1,5-pentanediol (15%), 1,2-hexanediol (3%), 2-pyrrolidinone (9%D), 2-ethyl-2-(hydroxymethyl)-1,3-propanediol (9%), Surfynol 465™ (0.5%), Tergitol 15-S-5™ (0.6%), Proxel GXL™ (0.06%), Kordek MLX™ (0.05%), high purity water (62.79%).

Other inks, S-2 to S-4, for soluble dyes I-5, I-6, and I-7 were prepares similarly using 0.35 g, 0.237 g, and 0.305 g of dye with the appropriate amount of water, respectively, to bring the total weight of the dye/water combination to 5 gms.

Preparation of Inventive Inks N-1 to N-6 Containing Insoluble Colorants I-8, I-9, I-11, I-13, I-16, and I-17

Insoluble dyes (pigments) were first dispersed in water as follows. Insoluble colorant (1 g), potassium oleylmethyltaurine (0.3 g), and 13.7 g distilled water were mixed with 70 g of 0.11 mm YTZ zirconia grinding media from Tosoh Corporation. The mixture was placed into a 50 cc plastic centrifuge tube. A 0.5" diameter shaft with 0.25" long protruding knobs was inserted into the tube and stirred at 2300 rpm for 24 hrs. The resulting dispersion of yellow pigment was separated from the grinding media by filtration through a coarse sintered glass funnel.

To formulate ink N-1 for inventive colorant I-8, 3.76 g of the pigment dispersion was added to 1.24 g of water and 5 g of a solution that was 14% glycerol, 10% ethylene glycol, 4% N-butanol, 0.04% Kordek MLX®, 0.26% triethanolamine, 2.6% benzylmethacrylate, methacrylic acid co-polymer (67/33 by weight), 1% Strodex PK-90®, and 68.1% water.

Inks containing insoluble colorants I-9, I-11, I-13, and I-16, were made similarly, using 5.19 g, 3.16 g, 4.56 g, and 5.27 g, of pigment dispersion with the appropriate amount of water, respectively, as described above. In the case of a colorant weight of greater than 5 gms, no water is added.

Ink N-6 was made containing inventive colorant I-17 in the same way except that the 5 g of solution had this composition: 14% glycerol, 10% ethylene glycol, 0.04% Kordek MLX®, 0.26% triethanolamine, 2.6% benzylmethacrylate, methacylic acid co-polymer (67/33 by weight), 1% Strodex PK-90®, and 72.1% water. To this solution was added 3.8 g of dispersion of I-17 and 1.2 g water.

TABLE 3

| Inventive colorant | Inventive ink | λmax[1] | Color[1] |
|---|---|---|---|
| I-4 | S-1 | 421 | yellow |
| I-5 | S-2 | 497 | orange-red |
| I-6 | S-3 | 470 | orange |
| I-7 | S-4 | 410 | yellow |
| I-8 | N-1 | 449 | yellow-orange |
| I-9 | N-2 | 491 | red |
| I-11 | N-3 | 463 | yellow |
| I-12 |  | 458 | orange |
| I-13 | N-4 | 429 | yellow |
| I-14 |  | 458 | orange |
| I-15 |  | 438 | orange |
| I-16 | N-5 | 444 | orange |
| I-17 | N-6 | 455 | yellow-orange |

[1]The wavelength of maximum absorption of the pigment dispersion was obtained by diluting the concentrated dispersion and obtaining an ultraviolet/visible transmission spectrum of the dilute sample. The color is the color of the diluted sample.

Evaluation of Inks

The inks were loaded into empty ink cartridges and printed using a Canon S520 printer. The receiver was a porous glossy photo paper made by Konica. A target of four patches of pure yellow ink was printed at 25, 50, 75, and 100% of ink delivery. The blue density of each patch was recorded using a calibrated X-rite™ densitometer. The printed target was then exposed to various environmental conditions. The blue density of the patches after exposure was then recorded again and the amount of original density retained was calculated as the ratio of densities for the 100% ink patch.

TABLE 4

| Colorant | Ink | 1 wk ozone[1] | 24 hr ozone[1] | 2 wk ozone[2] | 50 Klux[3] |
|---|---|---|---|---|---|
| I-4 | S-1 | Not tested | 96% | 98% | 95% |
| I-5 | S-2 | Not tested | 21% | 46% | 25% |
| I-6 | S-3 | Not tested | 94% | 93% | 0% |
| I-7 | S-4 | Not tested | 96% | 85% | 67% |
| I-8 | N-1 | 94% | Not tested | Not tested | 5% |
| I-9 | N-2 | 100% | Not tested | Not tested | 39% |
| I-11 | N-3 | 77% | Not tested | Not tested | 6% |
| I-13 | N-4 | 97% | Not tested | Not tested | 8% |
| I-16 | N-5 | 94% | Not tested | Not tested | 36% |

TABLE 4-continued

| Colorant | Ink | 1 wk ozone[1] | 24 hr ozone[1] | 2 wk ozone[2] | 50 Klux[3] |
|---|---|---|---|---|---|
| I-17 | N-6 | 99% | Not tested | Not tested | 9% |
| DY132 |  | Not tested | 73% | 79% | 37% |

[1]Test prints were placed in a darkened ozone chamber with a concentration of 5 ppm ozone. Soluble dyes were tested for 24 hrs, insoluble dyes (pigments) were tested for 1 week, as, in general, pigments fade more slowly than soluble dyes.
[2]Test prints were placed in an environmentally controlled room under ambient light with a concentration of 60 ppb ozone for two weeks.
[3]Uncovered test strips were exposed to 50 Klux xenon arc lamp filtered to mimic D60 daylight for a period of 4 weeks at an intensity of 50 Klux.

Table 4 shows the utility of the inventive compounds for use as colorants with good ozone stability.

The invention has been described in detail with particular reference to certain preferred embodiments thereof, but it will be understood that variations and modifications can be effected within the spirit and scope of the invention.

The invention claimed is:

1. A colorant of Formula 1:

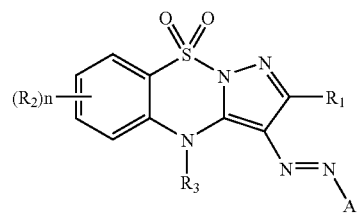

wherein:
$R_1$ and $R_2$ are hydrogen or any non-metallic group;
n is an integer of from 0-4;
$R_3$ is hydrogen, acyl, aryl, alkenyl, alkynyl or alkyl; and
A represents a substituted or unsubstituted aromatic heterocyclic ring.

2. The colorant of claim 1 wherein A is a 5-7 membered heterocyclic aromatic ring.

3. The colorant of claim 2 wherein A is selected from the group consisting of:

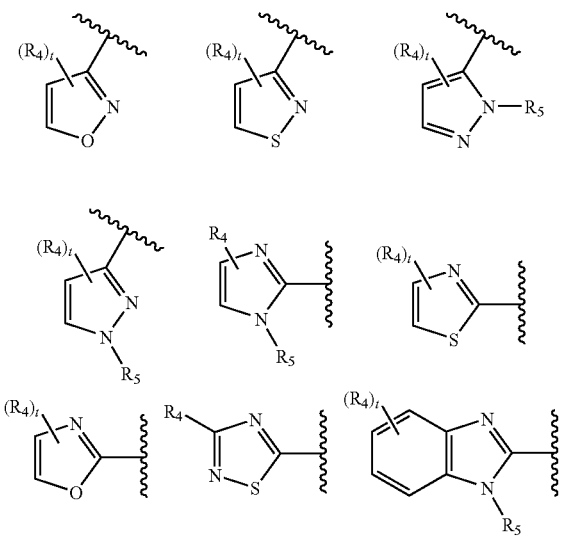

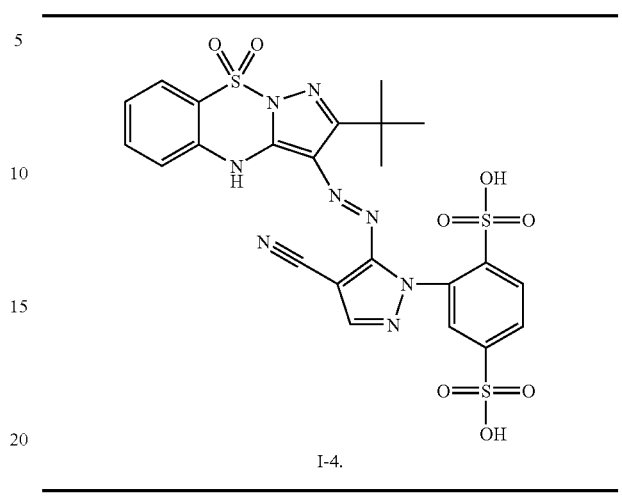

wherein:
  t is an integer of from 0-4;
  $R_4$ is hydrogen or any non-metallic group; and
  $R_5$ is hydrogen, acyl, aryl, alkenyl, alkynyl or alkyl.

4. The colorant of claim 2 wherein A is selected from the group consisting of pyrazolo, isothiazolo, imidazolo, thiazolo, thiadiazolo, benzothiazolo, and benzisothiazolo.

5. The colorant of claim 2 wherein Formula 1 is:

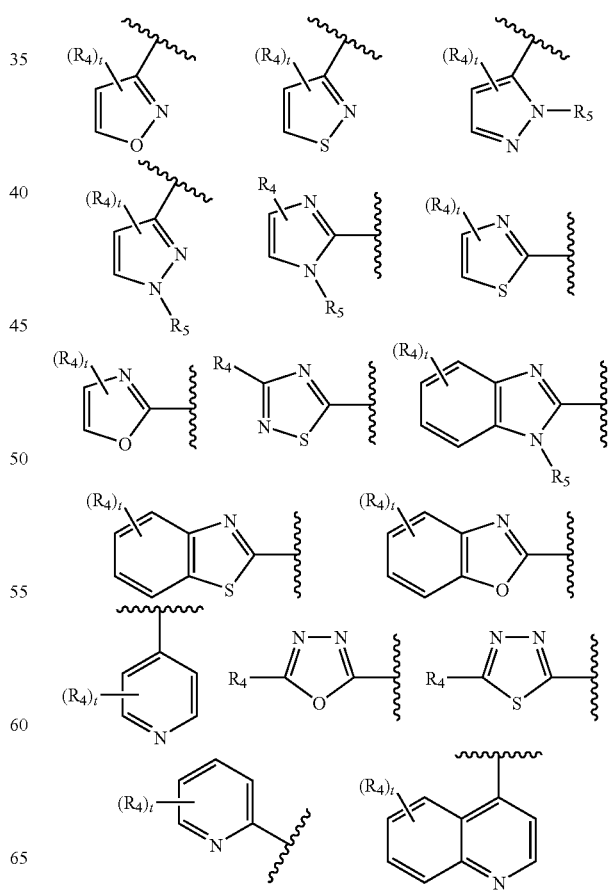

I-4.

6. The colorant of claim 1 where the colorant of Formula 1 does not contain an ionizable acid group and is insoluble in water.

7. The colorant of claim 6 wherein A is a 5-7 membered heterocyclic aromatic ring.

8. The colorant of claim 7 wherein A is selected from the group consisting of:

-continued

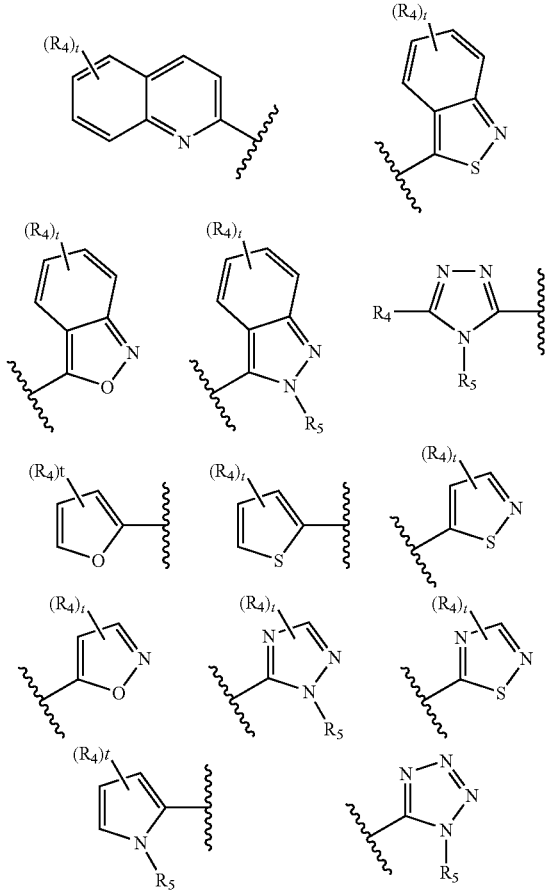

wherein:
t is an integer of from 0-4;
R₄ is hydrogen or any non-metallic group; and
R₅ is hydrogen, acyl, aryl, alkenyl, alkynyl or alkyl.

9. The colorant of claim 7 wherein A is selected from the group consisting of pyrazolo, isothiazolo, imidazolo, thiazolo, thiadiazolo, benzothiazolo, and benzisothiazolo.

10. The colorant of claim 7 wherein Formula 1 is:

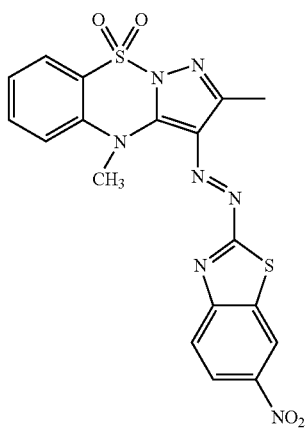

I-16.

11. An aqueous inkjet ink that comprises at least one colorant of Formula 1:

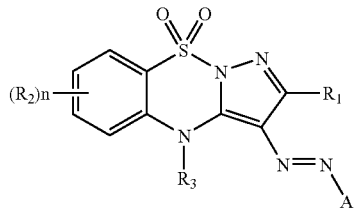

wherein:
R₁ and R₂ are hydrogen or any non-metallic group;
n is an integer of from 0-4;
R₃ is hydrogen, acyl, aryl, alkenyl, alkynyl or alkyl;
A represents a substituted or unsubstituted aromatic or heteroaromatic ring; and
A is capable of being fused to or bonded to another ring or rings that can be aromatic, aliphatic or heterocyclic.

12. The ink of claim 11 that also contains at least one water-miscible organic solvent at a level of 5-40% by weight.

13. The ink of claim 11 wherein the colorant of Formula 1 is present from 0.1-10% by weight.

14. The ink of claim 11 wherein the colorant of Formula 1 contains at least one ionizable acid group.

15. The ink of claim 11 wherein the colorant of Formula 1 is insoluble in water and is incorporated as a dispersion of particles.

16. The ink of claim 15 further comprising a dispersing aid at a level of 10-70% of the weight of the colorant of Formula 1.

17. The ink of claim 16 wherein the dispersing aid is a polymeric dispersant.

18. An ink printing method for creating an image on an ink compatible substrate comprising:
a. providing an apparatus with individually addressable nozzles capable of depositing drops of ink onto an ink compatible substrate;
b. loading said apparatus with an ink compatible substrate;
c. loading said apparatus with at least one ink containing a colorant of Formula 1 to be printed by said apparatus:

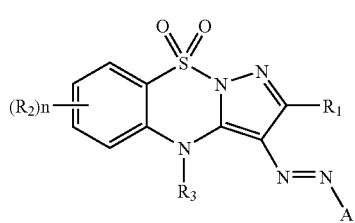

wherein:
R₁ and R₂ are hydrogen or any non-metallic group;
n is an integer of from 0-4;
R₃ is hydrogen, acyl, aryl, alkenyl, alkynyl or alkyl;
A represents a substituted or unsubstituted aromatic or heteroaromatic ring;

A is capable of being fused to or bonded to another ring or rings that can be aromatic, aliphatic or heterocyclic; and d. printing on said ink compatible substrate using said at least one ink containing a colorant of Formula 1.

19. The ink printing method of claim 18 wherein said ink compatible substrate is an ink recording element comprising a support having thereon an image receiving layer 20. The ink printing method of claim 18 further comprising two additional inks so that there are at least three inks, at least one of which is a cyan colored ink, at least one of which is a magenta colored ink, and at least one of which is a yellow colored ink.

* * * * *

UNITED STATES PATENT AND TRADEMARK OFFICE
CERTIFICATE OF CORRECTION

PATENT NO. : 7,582,149 B2  Page 1 of 1
APPLICATION NO. : 12/015110
DATED : September 1, 2009
INVENTOR(S) : Link et al.

It is certified that error appears in the above-identified patent and that said Letters Patent is hereby corrected as shown below:

In Column 31, lines 49-64, delete
"
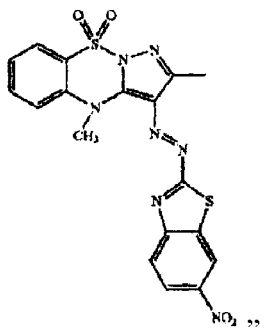
"
and insert --
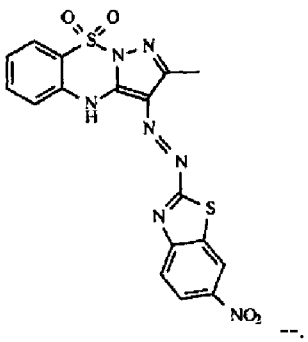
--.

Signed and Sealed this

Twenty-fourth Day of November, 2009

David J. Kappos
*Director of the United States Patent and Trademark Office*